United States Patent

[11] 3,572,610

| [72] | Inventors | T. O. Paine<br>Administrator of the National Aeronautics and Space Administration with respect to an invention of;<br>Jerry P. Hethcoat; Roland H. Norton, Huntsville, Calif. |
|---|---|---|
| [21] | Appl. No. | 840,176 |
| [22] | Filed | July 9, 1969 |
| [45] | Patented | Mar. 30, 1971 |

[54] THRUSTER MAINTENANCE SYSTEM
5 Claims, 5 Drawing Figs.

[52] U.S. Cl. .................................................. 244/1
[51] Int. Cl. .................................................. B64g 1/00
[50] Field of Search .................................. 244/1 (SS); 312/1; 2/2.1; 128/1; 61/82, 83; 49/68

[56] References Cited
UNITED STATES PATENTS

| 3,073,040 | 1/1963 | Schueller | 244/1(S.S.)X |
| 3,286,952 | 1/1966 | Seeler | 244/1(S.S.) |
| 3,386,685 | 6/1968 | Judd | 244/1(S.S.) |

FOREIGN PATENTS

| 1,461,529 | 11/1966 | France | 244/1(S.S.) |

Primary Examiner—Milton Buchler
Assistant Examiner—Jeffrey L. Forman
Attorneys—L. D. Wofford, Jr., G. T. McCoy and C. C. Wells, Jr.

ABSTRACT: A system for maintenance of a spacecraft thruster. The thruster is mounted on the exterior surface of a panel removably mounted on the spacecraft wall. A portable airlock is provided which may be removably sealed to the interior surface of the spacecraft wall about the removable panel. An operator within the spacecraft inserts his arms into space suit-type gloves extending into the airlock which enable him to remove the thruster panel and replace it with a new panel, afterwhich the portable airlock may be removed from the spacecraft wall.

Patented March 30, 1971

APPLICANT:

Thomas Q. Paine, Administrator of
NASA with respect to an invention of
Jerry P. Hethcoat and Roland H. Norton

BY

ATTORNEYS

APPLICANT:
Thomas O. Paine, Administrator of NASA with respect to an invention of Jerry P. Hethcoat and Roland H. Norton

ATTORNEYS

Patented March 30, 1971 3,572,610

APPLICANT:
Thomas O. Paine, Administrator of
NASA with respect to an invention of
Jerry P. Hethcoat and Roland H. Norton

BY

ATTORNEYS

THRUSTER MAINTENANCE SYSTEM

ORIGIN OF THE INVENTION

The invention described herein was made in the performance of work under a NASA contract and is subject to the provisions of Section 305 of the National Aeronautics and Space Act of 1958, Public Law 85—568 (72 Stat. 435; 42 USC 2457).

BACKGROUND OF THE INVENTION

1. Field of the Invention

The present invention relates to a spacecraft maintenance system and more specifically to a system for removing and repairing spacecraft control thrusters by the use of a portable airlock.

2. Description of the Prior Art

The attitude control thruster systems used on space vehicles and stations occasionally proved to be faulty or otherwise inoperative while in outer space. It has been proposed that astronauts undertake to leave the spacecraft and replace the faulty thruster assembly. Yet this necessarily requires the two or more astronauts to don their space suits, activate the main airlocks, and expose themselves to a hazardous space environment. While it is considered important that space vehicles or stations minimize the requirement of manned extravehicular activity, no device or spacecraft design has been made which will make possible the maintenance, repair, or replacement of an attitude control thruster without such activity.

SUMMARY OF THE INVENTION

In the present invention, the spacecraft control thruster system is mounted on a removable external wall panel of the spacecraft. A portable airlock having an opening in its back side is removably sealed to the inner surface of the spacecraft wall so the opening surrounds the removable panel. The airlock has a window to enable an operator to view the interior of the airlock. Also, the airlock has space suit-type gloves extending into its interior which enables an operator to insert his arms and hands thereinto and remove or otherwise manipulate the thruster panel. By having a new thruster panel within the airlock, the operator may replace the faulty thruster with a panel having a new thruster unit. The airlock may then be removed and used in another location.

Accordingly, it is an object of the present invention to provide a spacecraft system for removing thrusters units by an astronaut inside the spacecraft.

Another object is to provide a substantially portable airlock which may be sealed to a spacecraft wall and enable an astronaut to perform activities respecting the wall.

Other objects and advantages of the present invention will become more apparent from the following detailed description when taken together with the accompanying drawings.

DESCRIPTION The THE PREFERRED EMBODIMENT

Figure 1:
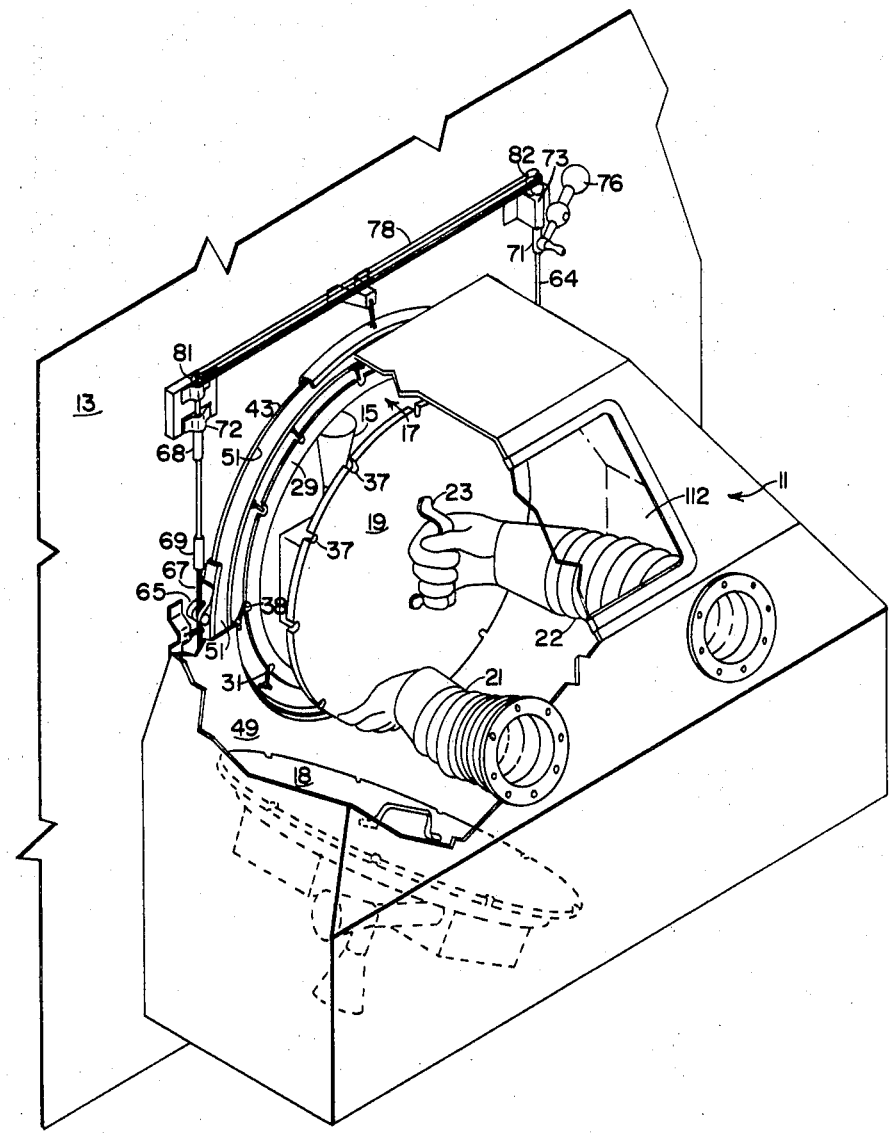
FIG. 1 is a perspective view of an apparatus according to the present invention, portions removed for clarity.

Referring to the drawings, and in particular to FIG. 1 wherein is illustrated a portable airlock 11 functionally related to the outer wall 13 of a spacecraft at a control thruster 15 location. The outer wall 13 has a circular opening 17 adapted to be sealed by a panel assembly 19 having the thrusters 15 mounted on the outerside. As illustrated, the panel 19 is being removed from the wall 13 of the spacecraft into the interior of a portable airlock 11 as if an astronaut had inserted his hands and arms into the flexible space suit-type gloves 21, 22 associated with the airlock 11 and grasped the panel handle 23. A replacement panel 18 is also available within the airlock enclosure.

Figure 3:
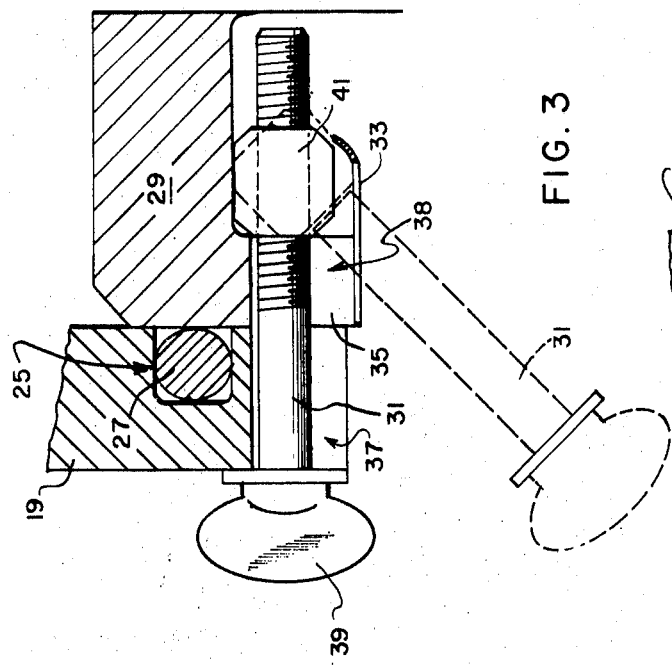
FIG. 3 is a sectional view taken along line 3–3 of FIG. 2 showing the thruster panel fastener bolt.
Figure 4:
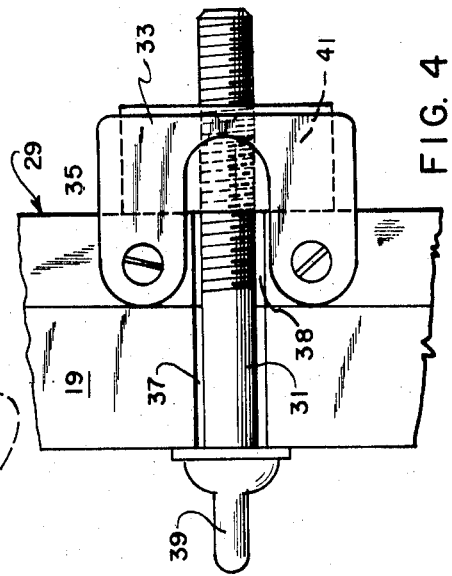
FIG. 4 is an edge view of the thruster panel and wall mounting ring at a fastener bolt location.
Figure 5:
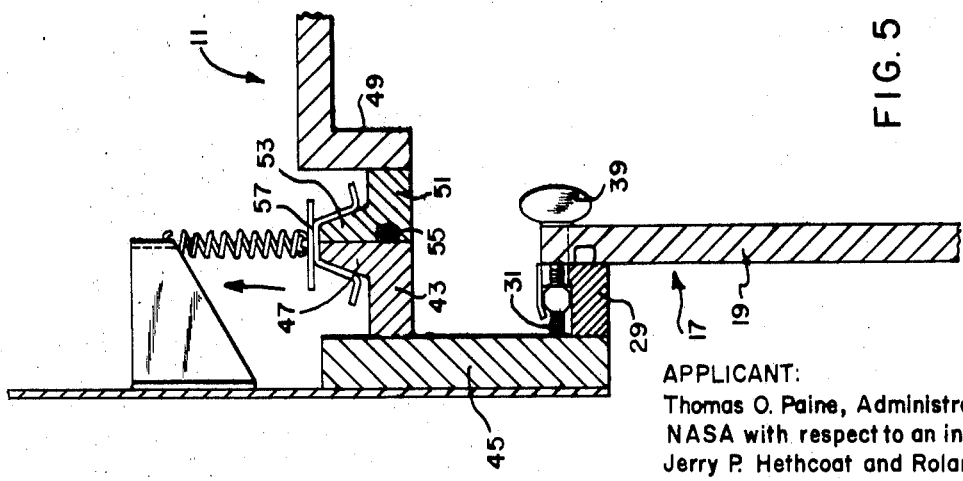
FIG. 5 is partial section view of the portable airlock mounting ring and clamp device, on the spacecraft wall.

As is indicated best by FIGS. 3 and 5, the thruster panel 19 has an annular edge groove 25 with a sealing O-ring member 27 making a positive seal against a mounting ring 29 surrounding the circular opening 17. A plurality of fasteners 31 are evenly spaced about the circumference of the panel 19 and are adapted to securely hold the panel 19 in position against the mounting ring 29 and to be easily manipulated to release the panel 19 when desired.

The fasteners 31 are pivotally secured to the mounting ring 29 by a retaining plate 33 secured the mounting ring flange 35. The fasteners 31 fit into matching edge recesses 37 and 38 on the thruster panel 19 and mounting ring 29, respectively and are tightened by individual thumbscrews 39 of fasteners 31 which act through nuts 41 held in position by the retaining plates 33. A particular fastener 31 may be keyed by color or otherwise to a particular panel groove 27 to assure the proper orientation of the panel 19.

A clamping device for the portable airlock 11 is associated with the inner surface of the spacecraft wall 13 surrounding the panel mounting ring 29. A first circular member 43 (see FIG. 5) having a substantial L-shaped cross section is secured to the inner wall 13 of the spacecraft, which in the present instance is shown in FIG. 5 as being provided with a reinforcing material 45. The first circular member 43 has an upstanding portion 47 forming a flange which has a substantially vertical flat edge surface. The upstanding portion 47 is thinner at the top than at the base so as to form an outwardly sloping surface opposite the flat edge.

The airlock enclosure 11 has as indicated by FIGS. 1 and 5 a circular opening in its rear panel 49, and secured adjacent the edge defined by the opening, or integral therewith, is a second member 51 similar to the first member 43. The second member 51 also has an upstanding flange 53 with a flat edge surface adapted to fit against the flat edge surface of the first member 43. The second member 51, however, has an annular groove 55 within its flat edge surface with an O-ring sealing member adapted to be pressed against the first member 43 and form an airtight seal.

Figure 2:
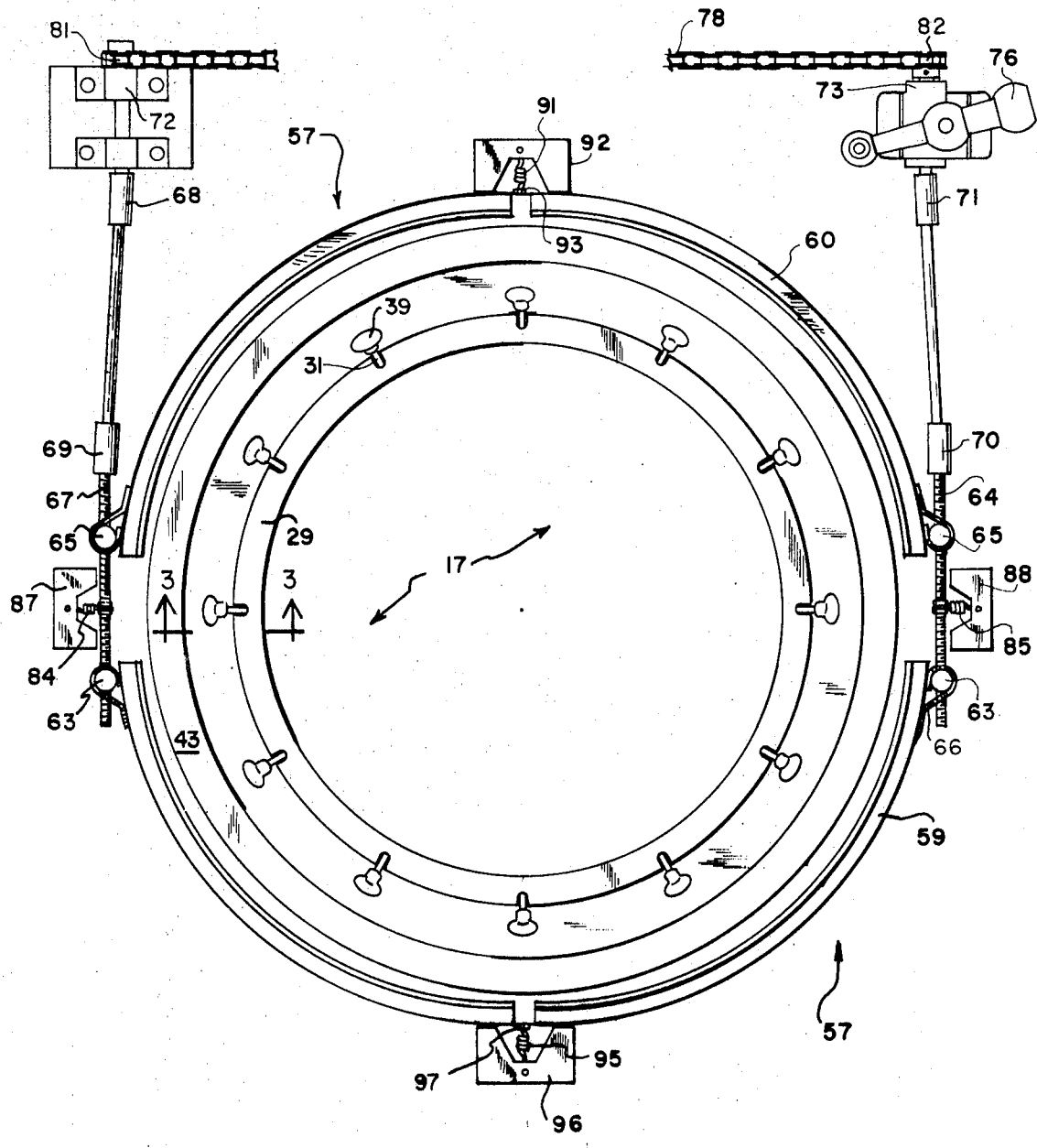
FIG. 2 is a front view of the removable spacecraft thruster panel with clamping device for the portable airlock.

The first and second members 43 and 51 are placed in abutting position and a V-shaped clamp 57 is adapted to fit over both upstanding portions 57 and 53 to securely lock them together. The clamp structure 57 as illustrated best in FIGS. 1 and 2 is composed of lower and upper arc sections 59 and 60 joined together at their ends by a pair of adjustable couplings. The ends of each arc section 59 and 60 have a cylindrical bar nut 63, 65 which is part of the adjustable coupling held by a metal piece 66 secured to the outer edge of the section and bent back over the bar 63, 65 and secured to itself. On each side of the member 43, a threaded rod 64, 67 extends down from above and is screwed through adjacent bar nuts 63, 65 of the arc segments 59, 60 so a turning of the rod 64, 67 in one direction will draw the adjacent nuts 63, 65 together and tighten the clamp 57 on the upstanding portions 57, 53 (FIG. 5) of the two piece mounting ring 43, 51. The rods 64, 67 adjacent their upper end and nuts are right handed threaded and rods 64, 67 adjacent their lower end and nuts 63 are left handed threaded.

Each rod 64, 67 may have flexible couplings 68, 69, 70, 71 to prevent any alignment problems. The upper ends of the rods 64, 67 are fastened to the inner surface of the spacecraft wall 13 by fixed bearings 72, 73. The right rod 64 includes an actuator 76 which is geared to the rod. The rotational movement of the right rod 64 is transmitted to the left rod 67 by an endless chain 78 extending over sprocket wheels 81, 82 secured to the upper ends of the rods 67, 64. Although, it should be apparent, that the left rod 67 could also have a separate actuator drive.

The lower ends of the rods 67, 64 are held in position by springs 84, 85. Each spring 84, 85 is secured at one end to a raised mount 87, 88 and extends to a rod 67, 64 where it is secured by a loosely fitting loop so as to not interfere with the rotation of the rod 64, 67.

The upper arc segment 60 of the V-shaped clamp 57 is supported from the inner surface of the spacecraft wall by a spring 91. The spring 91 is under a slight tension and extends from a wall mount 92 to a lug 93 on the upper surface of the segment 60. Also, the lower segment 59 is supported from the inner surface of the spacecraft wall by a lower spring 95 under a slight tension and extending from a wall mount 96 to a lower lug 97.

The portable airlock 11, as shown by FIG. 1, has a window 112 in an upper front panel of its enclosure whereby an astronaut may view the thruster panel 19. Also extending from the lower front panel are two flexible gloves 21, 22 of the space suit type which have a stretching as well as flexing ability. The astronaut may at times have his arm thrust into the gloves 21, 22 beyond his elbows, and at other times he will reach only slightly past his wrists.

If the thruster assembly 15 is of the type having umbilical connection for propellant feed and control lines, a quick disconnect (not shown) could be placed outside the spacecraft to ensure that propellants are excluded from the spacecraft interior. For ease of operation the umbilical could be designed to automatically connect or disconnect when the panel assembly 19 is removed.

Also, while it is not illustrated, the thruster panel 19 should have a pressure release valve at a suitable location to evacuate the airlock enclosure 11 when it is in position and an internally operated valve at a suitable location to allow repressurization after the new panel 18 is in position.

While the enclosure 11 has been described with the use of space suit-type gloves 21, 22 it is also contemplated to provide remote manipulators within the enclosure 11 which could be operated by external controls.

Obviously, many modifications and variations of the present invention are possible in light of the above teachings. It is, therefore, to be understood that within the scope of the appended claims the invention may be practiced other than as specifically claimed.

We claim:

1. In a spacecraft having an attitude control thruster control system, the improvement comprising:
    a wall of said spacecraft having an opening extending from the outside to the interior;
    a panel adapted to close and seal said spacecraft opening, said panel having a thruster system on its exterior surface;
    means for removably securing said panel to said spacecraft wall in a manner to close said opening;
    a portable airlock enclosure having an opening in its rear wall, said opening being larger than said panel;
    means for removably sealing the rear wall of said enclosure to said spacecraft wall with the opening in the rear wall of the enclosure extending about said panel; and
    said portable airlock enclosure having space suit type gloves extending into its interior and sealed to the enclosure so an operator may insert his arms therein and manually remove said thruster panel.

2. The combination as defined by claim 1 wherein said means for removably sealing the rear wall of airlock enclousure to the surface of the spacecraft wall, comprises:
    a first member secured to the interior surface of said spacecraft wall and extending about said opening;
    a second member secured to the outer surface of the rear wall of said airlock and extending about the opening therein; and
    a clamp means for grasping said first and second members in sealing relationship.

3. The combination as defined by claim 2 wherein:
    said first and second members each have an upstanding portion abutting each other;
    said clamp means having a band member with a receptacle adapted to receive the upstanding portions of said first and second member;
    said band member consisting of at least two segments joined together with an adjustable means adapted to draw the band tightly about the upstanding portions of said first and second members.

4. The combination as defined by claim 3 wherein said adjustable means for the two segments include:
    two pairs of nuts, each nut secured to an end of a segment; and
    a pair of threaded rods, each rod acting through a pair of adjacent nuts on contiguous segment ends.

5. The combination as defined by claim 4 including:
    means rotatably mounting said rods to the interior surface of said spacecraft; and
    means for gearing said two rods together.